(12) United States Patent
Kim et al.

(10) Patent No.: US 10,728,859 B2
(45) Date of Patent: Jul. 28, 2020

(54) METHOD AND APPARATUS FOR DETERMINING MAXIMUM TRANSMISSION POWER PER CARRIER IN MOBILE COMMUNICATION SYSTEM SUPPORTING CARRIER AGGREGATION

(75) Inventors: Soeng Hun Kim, Yongin-si (KR); Sang Bum Kim, Seoul (KR); Kyeong In Jeong, Suwon-si (KR); Gert-Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/271,390

(22) Filed: Oct. 12, 2011

(65) Prior Publication Data

US 2012/0087306 A1    Apr. 12, 2012

Related U.S. Application Data

(60) Provisional application No. 61/392,436, filed on Oct. 12, 2010, provisional application No. 61/410,493, filed on Nov. 5, 2010.

(30) Foreign Application Priority Data

Sep. 27, 2011    (KR) .................. 10-2011-0097409

(51) Int. Cl.
*H04W 4/00* (2018.01)
*H04W 52/36* (2009.01)
(Continued)

(52) U.S. Cl.
CPC ....... *H04W 52/365* (2013.01); *H04W 52/367* (2013.01); *H04L 5/001* (2013.01); *H04W 52/146* (2013.01); *H04W 52/34* (2013.01)

(58) Field of Classification Search
CPC ............ H04W 52/367; H04W 52/365; H04W 52/146; H04W 52/34; H04L 5/001
(Continued)

(56) References Cited

U.S. PATENT DOCUMENTS

2007/0097962 A1    5/2007   Yoon et al.
2008/0025254 A1*   1/2008   Love ................... H04W 52/242
                                                    370/329

(Continued)

FOREIGN PATENT DOCUMENTS

CN    101340711 A    1/2009
CN    101414947 A    4/2009

(Continued)

OTHER PUBLICATIONS

LG Electronics Inc., PHR format for CA, 3GPP TSG-RAN2 Meeting #70bis, R2-103937, pp. 1-2, URL http://www.3gpp.org/ftp/tsg_ran/WG2_RL2/TSGR2_70 bis/Docs/R2-103937.zip, Jul. 2010, Stockholm, Sweden.

(Continued)

*Primary Examiner* — Kodzovi Acolatse
*Assistant Examiner* — Farhad Ali
(74) *Attorney, Agent, or Firm* — Jefferson IP Law, LLP

(57) ABSTRACT

A method and apparatus for determining a maximum transmission power per carrier in a mobile communication system supporting carrier aggregation are provided. The method for determining the maximum transmission power of a terminal in a mobile communication system supporting carrier aggregation includes checking whether a data channel transmission occurs on each of a plurality of carriers of which Power Headrooms (PHs) are reported in an extended PH Report (PHR), and determining the maximum transmission power of each carrier of the plurality of carriers in consideration of whether the data channel transmission (Continued)

occurs on a carrier corresponding to the data channel transmission.

24 Claims, 7 Drawing Sheets

(51) Int. Cl.
  *H04L 5/00* (2006.01)
  *H04W 52/14* (2009.01)
  *H04W 52/34* (2009.01)
(58) Field of Classification Search
  USPC .......................................................... 370/328
  See application file for complete search history.

(56) References Cited

U.S. PATENT DOCUMENTS

| | | | |
|---|---|---|---|
| 2009/0257387 | A1 | 10/2009 | Gholmieh et al. |
| 2010/0016010 | A1 | 1/2010 | Kashiwase et al. |
| 2010/0080184 | A1 | 4/2010 | Tseng |
| 2010/0158147 | A1* | 6/2010 | Zhang et al. .................. 455/522 |
| 2010/0197339 | A1 | 8/2010 | Pedersen et al. |
| 2010/0238863 | A1 | 9/2010 | Guo et al. |
| 2010/0273515 | A1* | 10/2010 | Fabien ..................... H04L 5/006 455/509 |
| 2011/0007649 | A1 | 1/2011 | Takagi |
| 2011/0116467 | A1 | 5/2011 | Jung et al. |
| 2011/0245142 | A1 | 10/2011 | Gizaw et al. |
| 2011/0292874 | A1 | 12/2011 | Ho et al. |
| 2012/0087317 | A1* | 4/2012 | Bostrom ............... H04W 52/30 370/329 |
| 2012/0224535 | A1* | 9/2012 | Kim et al. ..................... 370/328 |
| 2012/0294167 | A1 | 11/2012 | Zhu et al. |
| 2013/0188570 | A1 | 7/2013 | Zhao et al. |

FOREIGN PATENT DOCUMENTS

| | | |
|---|---|---|
| CN | 101715207 A | 5/2010 |
| CN | 101778416 A | 7/2010 |
| CN | 101848487 A | 9/2010 |
| CN | 102104905 A | 6/2011 |
| EP | 2 230 875 A2 | 9/2010 |
| EP | 2 472 942 A1 | 7/2012 |
| EP | 2536198 A1 | 12/2012 |
| JP | 2010-226720 A | 10/2010 |
| JP | 2013-524037 A | 6/2013 |
| JP | 2013-533673 A | 8/2013 |
| KR | 10-2009-0046882 A | 5/2009 |
| KR | 10-2010-0009493 A | 1/2010 |
| KR | 10-2010-0105736 A | 9/2010 |
| NO | 2010/107907 A2 | 9/2010 |
| RU | 2008 116 168 A | 12/2009 |
| WO | 2009/008805 A2 | 1/2009 |
| WO | 2010/065759 A2 | 6/2010 |
| WO | 2010/091425 A2 | 8/2010 |
| WO | 2011/150361 A1 | 12/2011 |
| WO | WO 2012056273 A1 * | 5/2012 ............. H04L 5/001 |

OTHER PUBLICATIONS

CATT, New PHR trigger, 3GPP TSG RAN WG2 Meeting #71, R2-104512, pp. 1-2, URL http://www.3gpp.org/ftp/tsg_ran/WG2_RL2/TSGR2_71/Docs/R2-104512.zip, Aug. 2010, Madrid, Spain.
Panasonic, UE-specific Power headroom report, 3GPP TSG-RAN WG2 Meeting #70bis, R2-103602, Jun. 28, 2010, Stockholm, Sweden, XP050451149.
Research in Motion et al, Discussion on Per UE PHR, 3GPP TSG RAN WG1 Meeting #62, R1-104917, Aug. 23, 2010, Madrid, Spain, XP050450063.
Potevio, Remaining Issues on PHR for CA, 3GPP TSG RAN WG2#70, R2-102770, May 10, 2010, Montreal, Canada, XP050422890.
ZTE, Parallel transmission of two types PHR, 3GPP TSG RAN WG2 #70bis, R2-103725, Jun. 28, 2010, Stockholm, Sweden, XP050451200.
Nokia Siemens Networks et al., Further Consideration on Virtual PHR, 3GPP TSG-RAN WG2 Meeting #71, Aug. 23-27, 2010, pp. 2-5, R2-104394, Madrid, Spain.
LTE; Evolved Universal Terrestrial Radio Access (E-UTRA); Medium Access Control (MAC) protocol specification (3GPP TS 36.321 V9.3.0 Release 9), XP055121209, Jun. 3, 2014.
Ericsson (RAN2), LS on Timing Requirements for Activation and Deactivation of SCells, 3GPP TSG-RAN2 Meeting #71bis, R2-105961, XP050605479, Oct. 15, 2010.
Nokie Siemens Networks et al., Timing and HARQ Feedback Errors with Activation/Deactivation, 3GPP TSG-RAN WG2 Meeting #69bis, R2-101986, XP050422521, Apr. 6, 2010.
Huawei et al., Triggering and transmission of aperiodic CSI reports, 3GPP TSG RAN WG1 Meeting #62bis, R1-105128, XP050450349, Oct. 5, 2010.
ITRI: "Considerations on the remaining issues of PHR", 3GPP Draft; R2-104893, Considerations on the Remaining Issues of PHR V2, 3rd Generation Partnership Project (3GPP), XP050452011; Madrid, Spain; Aug. 23, 2010.
Alcatel-Lucent et al: "Discussion on PHR remaining issues", 3GPP Draft; R2-105648, 3rd Generation Partnership Project (3GPP), XP050452546; Xian, China; Oct. 11, 2010.
Ericsson: "Summary of e-mail discussion [71#57] LTE CA: PHR Reporting", 3GPP Draft; R2-105462—Summary of E-Mail Discussion 71#57—PHR Reporting, 3rd Generation Partnership Project (3GPP), XP050605439; Xian, China; Oct. 11, 2010.
TSG RAN WG1, LS on the reference format on virtual PHR, 3GPP TSG-RAN WG1#62b R1-105820; Xian, China; Oct. 11, 2010.
CATT: "Definition of Pcmax in CA", 3GPP Draft; R4-104357, 3rd Generation Partnership Project (3GPP), Mobile Competence Centre, XP050499529; Jacksonville, USA; Nov. 15, 2010.
LG Electronics, Aspect on Simultaneous Transmission of PRACH and UL Channels considering Multiple Timing Advance[online], 3GPP TSG-RAN WG1#67, 3GPP, Nov. 18, 2011, R1-113910; San Francisco, USA; Nov. 14, 2011.
Texas Instruments; On Power Headroom Reporting for Carrier Aggregation; 3GPP TSG RAN WG1 #60bis; R1-102096; Apr. 12-16, 2010; Beijing, China.
3GPP; 3rd Generation Partnership Project; Technical Specification Group Radio Access Network; Evolved Universal Terrestrial Radio Access (E-UTRA); Medium Access Control (MAC) protocol specification (Release 9); 3GPP TS 36.321 V9.3.0; Jun. 2010; Valbonne, France.
Nokia Siemens Networks et al.; Details of PHR for carrier aggregation; 3GPP TSG-RAN WG2 Meeting #70bis; R2-103558; Jun. 28-Jul. 2, 2010; Stockholm, Sweden.
Ericsson; Summary of e-mail discussion [70#15] LTE CA: PHR Handling; 3GPP TSG-RAN WG2 #70bis; Tdoc R2-103580; Jun. 28-Jul. 2, 2010; Stockholm, Sweden.
ZTE; Discussion on CC specific PHR reporting; 3GPP TSG RAN WG2 #70bis; R2-103724; Jun. 28-Jul. 2, 2010; Stockholm, Sweden.
ZTE; PHR remain issue; 3GPP TSG-RAN WG2 #71; Tdoc R2-104629; Jul. 23-26, 2010; Madrid, Spain.
Samsung; Discussion on PHR triggers; 3GPP TSG-RAN2#71; Tdoc R2-104829; Aug. 23-27, 2010; Madrid, Spain.
New Postcom; Discussion of PHR open issues; 3GPP TSG-RAN2#71bis; R2-105410; Oct. 11-15, 2010; Xi-an, China.
Ericsson, ST-Ericsson, Pcmax for carrier aggregation and how to test it[online], 3GPP TSG-RAN WG4#58AH, R4-112186; Apr. 15, 2011.
3rd Generation Partnership Project; Technical Specification Group Rad io Access Network; Evolved Universal Terrestrial Radio Access (E-UTRA); Physical layer procedures (Release 10), 3GPP TS 36.213 V10.2.0; Jun. 2011.
New Postcom, Unification of Extended PHR MAC CE formats[online] 3GPP TSG-RAN WG2#73, R2-111723; Feb. 25, 2011.
Alcatel-Lucent, Alcatel-Lucent Shanghai Bell, Simultaneous transmissions of RACH and PUCCH/PUSCH/SRS 3GPP TSG-RAN WG2#76, 3GPP, R2-116184; Nov. 18, 2011.

(56) References Cited

OTHER PUBLICATIONS

Samsung; PH calculation of non-transmitting CC; R2-104824; Aug. 23-27, 2010.
Samsung; PHR transmission; R2-104825; Aug. 23-27, 2010.
Samsung, PH calculation of non-transmitting CC[online], 3GPP TSG-RAN WG2#71bis, 3GPP, Oct. 5, 2010; R2-105403.
New Postcom, PHR MAC CE format design and analysis of relevant issues [online], 3GPP TSG-RAN WG2#71bis, 3GPP, 10-01-2010 R2-105411.
3rd Generation Partnership Project;Technical Specification Group Radio Access Network;Evolved Universal Terrestrial Radio Access (E-UTRA);Physical layer procedures(Release 10), 3GPP TS 36.213 V10.1.0, p. 6,9-14; Mar. 30, 2011.
Huawei, The possible impact of UL SU-MIMO on PH mapping[online] 3GPP TSG-RAN WG4#56;Aug. 23, 2010; R4-103044.
Panasonic, Open issues for power headroom reporting[online], 3GPP TSG-RAN WG2#71bis; Oct. 11, 2010; R2-105757.
3rd Generation Partnership Project;Technical Specification Group Radio Access Network;Evolved Universal Terrestrial Radio Access (E-UTRA) and Evolved Universal Terrestrial Radio Access Network (E-UTRAN);Overall description; Stage 2(Release 10), 3GPP TS 36.300 V10.0.0, p. 49,176; Jun. 18, 2010.
Japanese Office Action; Appeal #2017-7778; Japanese Patent Application #2013-533766.
Japanese Office Action; Japanese Patent Application #2017-106861.
Japanese Office Action; Patent Application #2017-194991.
Nokia; On LTE CA UE SEM, ACLR and MPR; 3GPP TSG-RAN WG4 Meeting #55; R4-101761; May 10-14, 2010; Montreal, CA.
Alcatel-Lucent et al.; MAC PHR CE format design for LTE-A CA scenario; 3GPP TSG-RAN WG2 Meeting #71b; R2-105651; Oct. 11-15, 2010; Xian, CN.
ITRI; PHR format for CA; 3GPP TSG RAN WG2 #71bis; R2-105818; Oct. 11-15, 2010; Xian, CN.
European Search Report dated Nov. 16, 2018; European Appln. No. 18198779.3-1219.
European Search Report dated Jan. 30, 2019; European Appln. No. 18210171.7-1219.
LTE; Evolved Universal Terrestrial Radio Access (E-UTRA); User Equipment (UE) radio transmission and reception (3GPP TS 36.101 version 8.10.0 Release 8); 3GPP TS 36.101 V8.10.0; 650 Route des Lucioles 7-06921 Sophia Antipolis Cedex—France; Jul. 2010.
HTC, "Power Headroom Reporting" 3GPP TSG-RAN WG1 #61, R1-102732, Montreal, Canada, May 10-14, 2010.
MediaTek, Per UE PHR for carrier aggregation, 3GPP TSG-RAN WG1 Meeting #61bis, R1-103743, Dresden, Germany, Jun. 28-Jul. 2, 2010.
Nokia Siemens Networks et al., R2-105379, PHR remaining issues, 3GPP TSG RAN WG2 #71bis, Xian, China, Oct. 11-15, 2010.
Alcatel-Lucent et al., R2-105649, PHR triggers and timer handling, 3GPP TSG RAN WG2 #71bis, Xian, China, Oct. 11-15, 2010.
Chinese Office Action dated Feb. 26, 2019, issued in Chinese Patent Application No. 201610579924.0.
Korean Office Action dated May 2, 2019, issued in Korean Patent Application No. 10-2019-0022041.
Mediatek, Further Details for REL-10 PHR, 3GPP TSG-RAN WG2 Meeting #71 bis, Oct. 11-15, 2010, R2-105444, Xi'an, China.
Ericsson et al., Details of PHR Handling for CA, 3GPP TSG-RAN WG2 #70bis, Jun. 28-Jul. 2, 2010, Tdoc R2-103570, Stockholm, Sweden.

* cited by examiner

METHOD AND APPARATUS FOR DETERMINING MAXIMUM TRANSMISSION POWER PER CARRIER IN MOBILE COMMUNICATION SYSTEM SUPPORTING CARRIER AGGREGATION

CROSS-REFERENCE TO RELATED APPLICATIONS

This application claims the benefit under 35 U.S.C. § 119(e) of a U.S. Provisional patent application filed on Oct. 12, 2010 in the United States Patent and Trademark Office and assigned Ser. No. 61/392,436, and of a U.S. Provisional patent application filed on Nov. 5, 2010 in the United States Patent and Trademark Office and assigned Ser. No. 61/410,493, and under 35 U.S.C. § 119(a) of a Korean patent application filed on Sep. 27, 2011 in the Korean Intellectual Property Office and assigned Ser. No. 10-2011-0097409, the entire disclosure of which is hereby incorporated by reference.

BACKGROUND OF THE INVENTION

1. Field of the Invention

The present invention relates to a method and apparatus for determining a maximum transmission power per carrier in a mobile communication system supporting carrier aggregation.

2. Description of the Related Art

Mobile communication systems have been developed to provide users with mobile voice and data communication services. With the rapid advance of technologies, the mobile communication systems have evolved to support high speed data communication services as well as the standard voice communication services.

Recently, as the next generation mobile communication system of the 3$^{rd}$ Generation Partnership Project (3GPP), Long Term Evolution (LTE) is under development. LTE technology allows for high-speed packet-based communication at about 100 Mbps, and was introduced to commercial markets around 2010. Regarding the commercialization of the LTE system, a discussion is being held on several schemes of the LTE system: one scheme for reducing a number of nodes located in a communication path by simplifying a configuration of the network, and another scheme for maximally approximating wireless protocols to wireless channels.

Unlike voice service, data service is characterized by network resources being allocated according to the data amount to be transmitted and channel condition. Accordingly, in the wireless communication system such as cellular communication system, a scheduler manages resource allocation in consideration of the resource amount, channel condition, and data amount. This is also the case in the LTE system such that the scheduler located in the base station manages and allocates the radio resource.

Recently, LTE-Advanced (LTE-A) is actively researched as an evolution of the LTE system so as to incorporate new techniques to increase data rate throughput. Carrier aggregation is one of the representative techniques that are newly adopted in LTE-A. Unlike data communication in which a User Equipment (UE) uses a single uplink carrier and a single downlink carrier, carrier aggregation enables the UE to use multiple uplink and/or downlink carriers. Since the conventional uplink transmission power determination algorithm is designed for the UE operating with one uplink carrier and one downlink carrier, it is difficult to apply the conventional transmission power determination process for uplink transmission power determination of the UE supporting carrier aggregation. Particularly, there is a need to define a procedure and method for reporting Power Headroom (PH) of the UE supporting carrier aggregation.

SUMMARY OF THE INVENTION

Aspects of the present invention are to address at least the above-mentioned problems and/or disadvantages and to provide at least the advantages described below. Accordingly, an aspect of the present invention is to provide a method and apparatus for determining a maximum transmission power of a UE per carrier in a mobile communication system supporting carrier aggregation.

In accordance with an aspect of the present invention, a method for determining a maximum transmission power of a terminal in a mobile communication system supporting carrier aggregation is provided. The method includes checking whether a data channel transmission occurs on each of a plurality of carriers of which Power Headrooms (PHs) are reported in an extended PH Report (PHR), and determining the maximum transmission power of each of the plurality of carriers in consideration of whether the data channel transmission occurs on each of the plurality of carriers.

In accordance with another aspect of the present invention, an apparatus for determining a maximum transmission power of a terminal in a mobile communication system supporting carrier aggregation is provided. The apparatus includes a controller for determining whether a data channel transmission occurs on each of a plurality of carriers of which Power Headrooms (PHs) are reported in an extended PH Report (PHR), and a calculator for determining the maximum transmission power of each carrier of the plurality of carriers in consideration of whether the data channel transmission occurs on a carrier corresponding to the data channel transmission.

In accordance with another aspect of the present invention, a Power Headroom (PH) reception method of a base station in a mobile communication system supporting carrier aggregation is provided. The method includes receiving an extended PH Report (PHR) transmitted by a terminal on one of a plurality of carriers, and checking PHs of the carriers in the extended PHR, wherein the terminal determines a maximum transmission power of each of the plurality of carriers in consideration of whether a data channel transmission occurs on each of the plurality of carriers.

In accordance with still another aspect of the present invention, a Power Headroom (PH) reception apparatus of a base station in a mobile communication system supporting carrier aggregation is provided. The apparatus includes a receiver which receives an extended PH Report (PHR) transmitted by a terminal on one of a plurality of activated carriers, and a controller which checks PHs of the carriers in the extended PHR, wherein the terminal determines a maximum transmission power of each carrier of the plurality of activated carriers in consideration of whether a data channel transmission occurs on a carrier corresponding to the data channel transmission.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention relates to a method and apparatus for a UE to report Power Headroom (PH) information per carrier in a mobile communication system supporting carrier aggregation.

Figure 1:
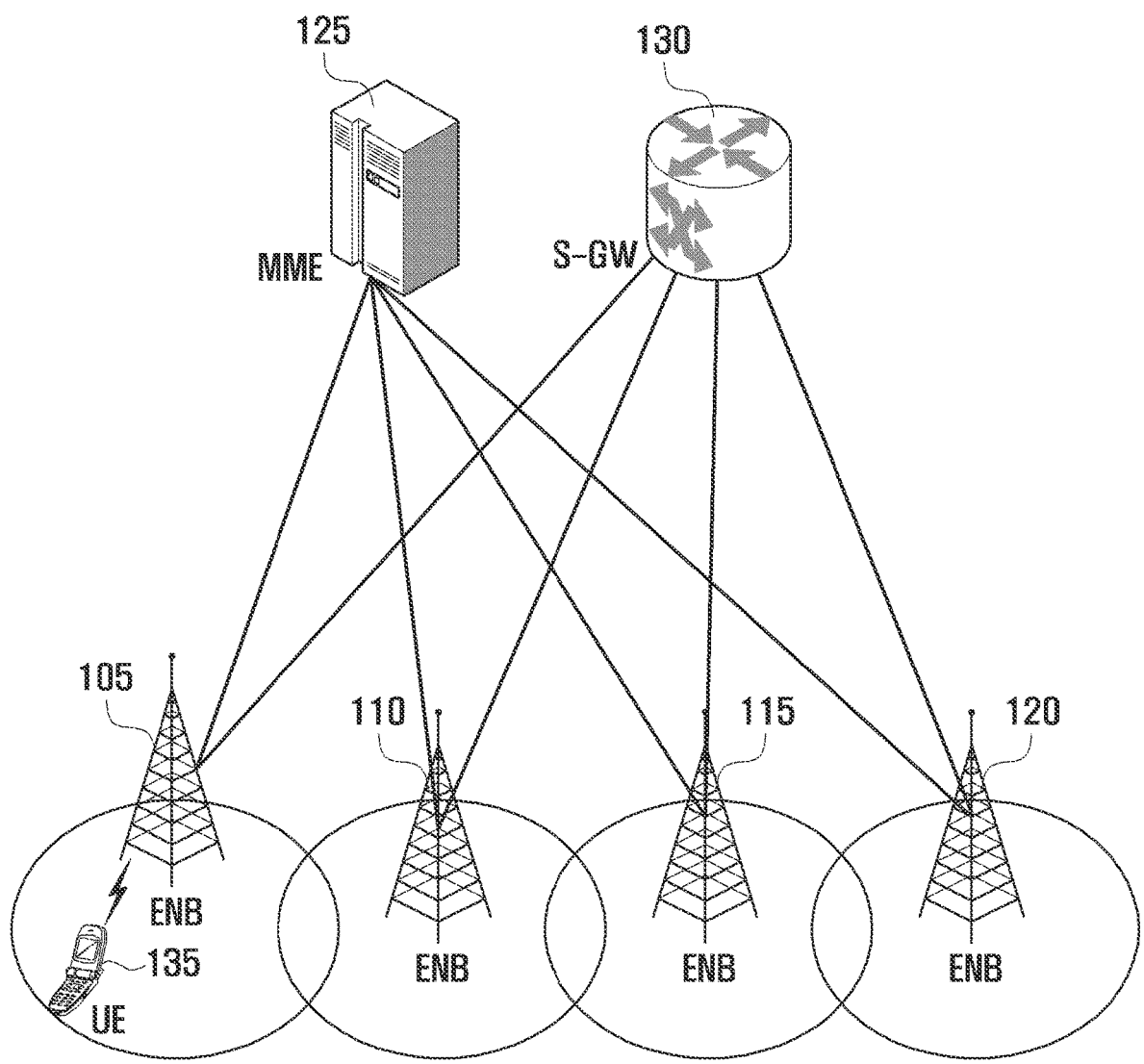
FIG. 1 is a diagram illustrating the architecture of a mobile communication system according to an exemplary embodiment of the present invention.
Figure 2:
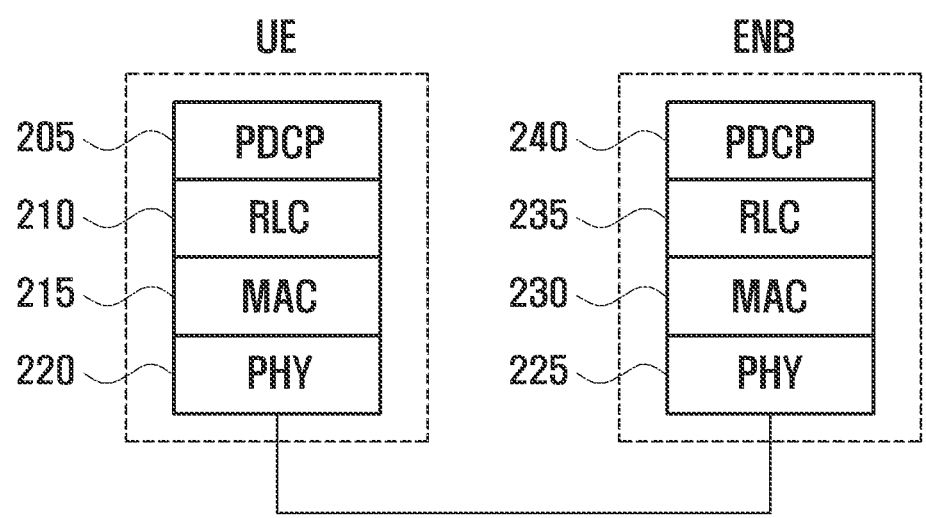
FIG. 2 is a diagram illustrating a protocol stack of the mobile communication system according to an exemplary embodiment of the present invention.
Figure 3:
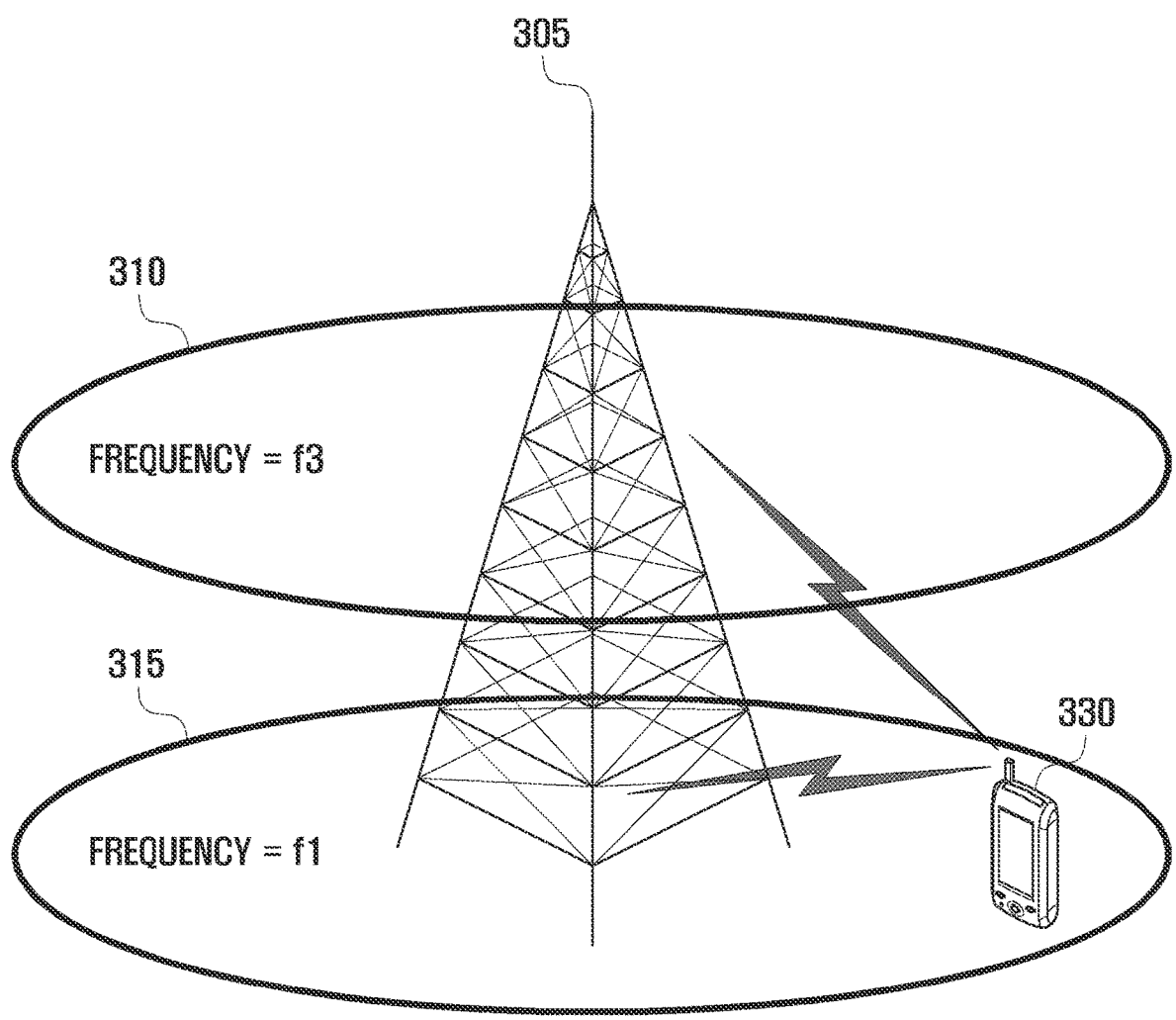
FIG. 3 is a diagram illustrating an exemplary situation of carrier aggregation in the mobile communication system according to an exemplary embodiment of the present invention.

Prior to explaining exemplary embodiments of the present invention, a description is made of the mobile communication system to which the present invention is applied with reference to FIGS. 1, 2, and 3. In the following, the description is directed to the case of LTE system.

FIG. 1 is a diagram illustrating the architecture of a mobile communication system according to an exemplary embodiment of the present invention.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

The eNBs 105, 110, 115, and 120 correspond to legacy node Bs of Universal Mobile Telecommunications System (UMTS). The eNBs 105, 110, 115, and 120 allow the UE establish a radio link and are responsible for more complicated functions as compared to the legacy node B. In the LTE system, all the user traffic, including real time services such as Voice over Internet Protocol (VoIP), are provided through a shared channel and thus there is a need for a device which is located in the eNB to schedule data transfers based on state information of the UEs. In order to implement the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 provides data bearers so as to establish and release data bearers under the control of the MME 125. The MME 125 is responsible for various control functions and is connected to a plurality of eNBs 105, 110, 115, and 120.

FIG. 2 is a diagram illustrating a protocol stack of the mobile communication system according to an exemplary embodiment of the present invention.

Referring to FIG. 2, the protocol stack of the LTE system includes a Packet Data Convergence Protocol (PDCP) layer 205 and 240, a Radio Link Control (RLC) layer 210 and 235, a Medium Access Control (MAC) layer 215 and 230, and a Physical (PHY) layer 220 and 225. The PDCP layer 205 and 240 is responsible for IP header compression/decompression. The RLC layer 210 and 235 is responsible for segmenting the PDCP Protocol Data Unit (PDU) into segments of appropriate size for Automatic Repeat Request (ARQ) operations. The MAC layer 215 and 230 is responsible for establishing connection to a plurality of RLC entities so as to multiplex the RLC PDUs into MAC PDUs and demultiplex the MAC PDUs into RLC PDUs. The PHY layer 220 and 225 performs channel coding on the MAC PDU and modulates the MAC PDU into OFDM symbols to be transmitted over a radio channel or performs demodulating and channel-decoding on the received OFDM symbols and delivers the decoded data to a higher layer. With respect to data transmission, the data input to a protocol entity is referred to as Service Data Unit (SDU), and the data output by the protocol entity is referred to as Protocol Data Unit (PDU).

FIG. 3 is a diagram illustrating an exemplary situation of carrier aggregation in the mobile communication system according to an exemplary embodiment of the present invention.

Referring to FIG. 3, typically an eNB can use multiple carriers that transmit and receive data in different frequency bands. For example, the eNB 305 can be configured to use a carrier 315 with center frequency f1 and a carrier 310 with center frequency f3. If carrier aggregation is not supported, a UE 330 has to transmit/receive data using only one of the carriers 310 and 315. However, the UE 330 having the carrier aggregation capability can transmit/receive data using both the carriers 310 and 315. The eNB can increase the amount of the resource to be allocated to the UE 300 having the carrier aggregation capability according to the channel condition of the UE 300 so as to improve the data rate of the UE 300.

In a case that a cell is configured with one downlink carrier and one uplink carrier, the carrier aggregation can be understood as if the UE 300 communicates data via multiple cells. With the use of carrier aggregation, the maximum data rate increases in proportion to the number of aggregated carriers. The aggregated carriers are configured via RRC signaling. In LTE, it is possible to add or remove a carrier to or from the carrier aggregation using a RRC Connection Reconfiguration message. Although a specific carrier is configured via the RRC signaling, data transmission is not performed yet. In order to use a Corresponding Carrier (CC), it is necessary to activate the carrier by MAC signaling. In LTE, the configured carrier is activated by a MAC Control Element (CE) in the MAC PDU. Since the service is provided through the multiple activated carriers, there are multiple serving cells that provide the service through the multiple activated carriers.

Meanwhile, in order to mitigate interference, the uplink transmission power is maintained to be below an appropriate level. For this purpose, the UE, such as the UE 300 of FIG. 3, calculates the uplink transmission power using a predetermined function and performs uplink transmission at the calculated uplink transmission power. For example, the UE calculates the required uplink transmission power value by inputting the input values and performs uplink transmission by applying the calculated uplink transmission power value. The input values may include the scheduling information including a resource amount and a Modulation and Coding Scheme (MCS) allocated to the UE and information necessary for estimating the channel condition such as path loss, among other types of similar input values and information.

The available uplink transmission power value of the UE is limited to a maximum transmission power value of the UE, such that when the calculated transmission power value exceeds the maximum transmission power value, the UE performs the uplink transmission at the maximum transmission power rather than the calculated transmission power value. In this case, the uplink transmission power, which is the maximum transmission power value of the UE, is not enough, resulting in uplink transmission quality degradation. Accordingly, the eNB performs scheduling such that the required transmission power does not exceed the maximum transmission power value of the UE. However, since a few parameters, such as path loss, cannot be checked by the eNB, the UE has to report its Power Headroom (PH) value to the eNB by means of a PH Report (PHR).

There are several factors influencing the power headroom value: 1) an allocated transmission resource amount, 2) a MCS to be applied to uplink transmission, 3) a Path Loss (PL) of the related downlink carrier, and 4) an accumulated transmission power control command value. Among these several factors, the Path Loss and the accumulated transmission power control command value vary according to the uplink carrier such that, when multiple uplink carriers are aggregated, the transmission of PHR is configured per carrier.

However, in order to transmit the PHR efficiently, the PHs of all the uplink carriers are reported using one uplink carrier. Depending on the management policy, it may be necessary to transmit the PH of the carrier on which no Physical Uplink Shared Channel (PUSCH) transmission takes place. In this case, it can be more efficient to report the PHs of the multiple uplink carriers on a single uplink carrier. For this purpose, it is necessary to extend a size of the PHR so as to include the report of all of the PHs of the multiple uplink carriers. The multiple PHs to be contained in the PHR can be arranged in a predetermined order.

Figure 4:
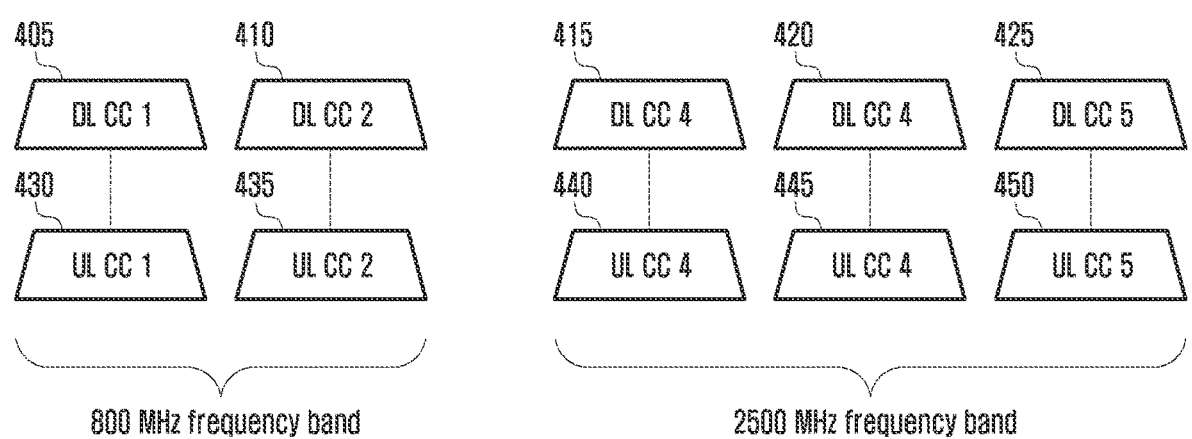
FIG. 4 is a conceptual diagram illustrating a principle of carrier aggregation for use in the mobile communication according to an exemplary embodiment of the present invention.

FIG. 4 is a conceptual diagram illustrating a principle of carrier aggregation for use in the mobile communication according to an exemplary embodiment of the present invention.

Referring to FIG. 4, five uplink carriers 430, 435, 440 445 and 450, that are shown as UL Component Carriers (CC) 1 through UL CC 5 in FIG. 4, can be aggregated for the UE, and one of the aggregated carriers can be selected to transmit the PHs for all of the 5 uplink carriers. For example, when three uplink carriers 440, 445, and 450, each of which are in a 2500 MHz frequency band, are aggregated for the UE, a PHR can be configured to carry the PHs for the three uplink carriers on the selected one of the aggregated carriers. Furthermore, as shown in FIG. 4, five downlink carriers 405, 410, 415, 420 and 425, that are shows as DL CC 1 through DL CC 5 respectively correspond to the five uplink carriers UL CC 1 through UL CC 5.

The PHR is triggered by anyone of a path loss of the connected downlink carrier is equal to or greater than a predetermined threshold value, a prohibit PHR time expires, and a predetermined time period elapses after the PHR generation. Once the PHR has been triggered, the UE waits until the time available for the uplink transmission arrives, or in other words, the UE waits until the time for when the uplink transmission resource is allocated rather than transmitting the PHR immediately. The UE may wait until this time because the PHR is not sensitive to delay. The UE transmits the PHR at the first uplink transmission. The PHR is MAC layer control information and has a length of 8 bits. The first two bits of the PHR are reserved for future use, and the remaining 6 bits are used to indicate the PH value in a range between −23 dB and 40 dB as the power headroom of the UE. The UE calculates the PH value using the following Equation:

$$PH(i) = P_{CMAX,c}(i) - \{10 \log_{10}(M_{PUSCH,c}(i) + P_{O\_PUSCH,c}(j) + \alpha_c(j) \cdot PL_c + \Delta_{TF,c}(i) + f_c(i)\} \quad \text{Equation (1)}$$

The PH(i) of the $i^{th}$ subframe in the serving cell c is calculated using the maximum uplink transmission power $P_{CMAX,c}(i)$, the number of resource blocks $M_{PUSCH,c}(i)$, the power offset derived from MCS $\Delta_{TF,c}$, the Path Loss $PL_c$, and the accumulated TPC commands $f_c(i)$. In Equation (1), $PL_c$ denotes the path loss of the cell, which provides information on the path loss in the service cell c. The path loss used to determine the uplink transmission power of a certain serving cell is the path loss of the downlink channel of the corresponding cell or the path loss of a downlink channel of another cell. The cell of which the cell's path loss is to be used is selected by the eNB and notified to the UE in the call setup process. In Equation (1), $f_c(i)$ is the value of the accumulated Transmission Power Control commands of the serving cell c. $P_{O\_PUSCH,c}$ denotes a higher layer parameter corresponding to a sum of cell-specific and UE-specific values. Typically, $P_{O\_PUSCH,c}$ is set to a value determined according to the transmission scheduling type of PUSCH, such as a semi-persistent scheduling, a dynamic scheduling, and a random access response. $\alpha_c$ denotes 3-bit cell specific value provided from a higher layer and is a weight applied to the path loss when calculating uplink transmission power (i.e., the higher this value is, the more the path loss influences the uplink transmission power), and its value is limited according to the transmission type of the PUSCH. j denotes the transmission type of the PUSCH. The parameter j is set to 0 for the semi-persistent scheduling, is set to 1 for the dynamic scheduling, and is set to 2 for the random access response. If there is no PUSCH transmission, $M_{PUSCH}$ and $\Delta_{TF}$ are not applied to the Equation (1).

In the mobile communication system supporting carrier aggregation, there can be a serving cell in which no PUSCH transmission takes place and a serving cell in which PUSCH transmission takes place. Also, the PH for a serving cell can be reported in a serving cell other than the serving cell to which it corresponds. In the mobile communication system supporting carrier aggregation, when it is necessary to report the PHs of multiple serving cells, the UE can transmit the PHs in a single PHR. This method reduces the signaling overhead as compared to the method of transmitting the PHs individually in each of their respective cells, and the eNB can acquire the PH for the carrier on which no PUSCH is transmitted.

Figure 5:
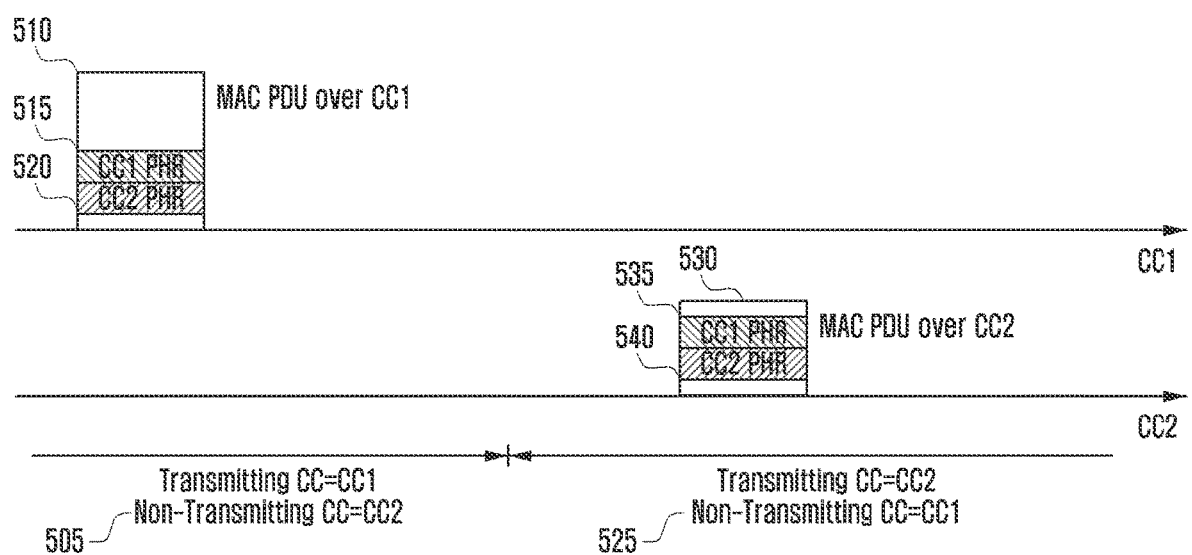
FIG. 5 is a diagram illustrating a scenario of Power Headroom (PH) reporting according to an exemplary embodiment of the present invention.

FIG. 5 is a diagram illustrating a scenario of PH reporting according to an exemplary embodiment of the present invention.

Referring to FIG. 5, the diagram shows a scenario in which each of two serving cells CC1 and CC2 transmits the PHs of both the serving cells. In the time duration 505, during which PUSCH transmission takes place in CC1 but not in CC2, the UE can transmit a MAC PDU 510 containing a CC1 PH 515 and a CC2 PH 520. In the time duration 525, during which PUSCH transmission takes place in CC2 but not in CC1, the UE can transmit a MAC PDU 530 containing the a CC1 PH 535 and a CC2 PH 540.

In an exemplary embodiment of the present invention, a method for calculating the UE's maximum uplink transmission power $P_{CMAX,c}$ per carrier depends on whether the PUSCH is transmitted. In a case where the PUSCH is transmitted, the UE determines the maximum uplink transmission power in consideration of all the uplink transmissions in the corresponding Transmission Time Interval (TTI) for the PH calculation. In case where the PUSCH is not transmitted, the UE determines the maximum uplink transmission power without consideration of the uplink transmission of other cells in the corresponding TTI for the PH calculation.

If PHR is triggered in the specific serving cell, the UE determines the method for calculating UE's maximum uplink transmission power $P_{CMAX,c}$ according to whether the PUSCH is transmitted. If the PUSCH is transmitted in the serving cell, the PH is calculated with Equation (1) according to a normal technique. At this time, the UE's maximum uplink transmission power $P_{CMAX,c}$ is calculated in consideration of all the uplink transmissions in the corresponding TTI. This is because the uplink transmission of the serving cell may influence the uplink transmissions in other cells unnecessarily. In order to maintain the transmission power below the level that unnecessarily uplink transmissions in the other cells, it is necessary to decrease the uplink transmission power of the serving cell. When all the uplink transmissions in the corresponding TTI are taken into consideration, the amount and position of the radio resources, MCSs, and channel bandwidths of other carriers, and influence of the frequency band are taken into consideration for calculating the UE's maximum uplink transmission power $P_{CMAX,c}$. For example, when calculating the UE's maximum uplink transmission power $P_{CMAX,c}$ of a specific carrier, a specific margin value can be applied to the UE's maximum uplink transmission power calculation process according to whether the carriers scheduled in the same TTI use adjacent frequency bands. The UE's maximum uplink transmission power $P_{CMAX,c}$ is in the following range:

$$P_{CMAX\_L,c} \leq P_{CMAX,c} \leq P_{CMAX\_H,c} \quad \text{Equation (2)}$$

If there is no adjacent frequency band for the carriers scheduled simultaneously in the same TTI, $P_{CMAX\_L,c}$ can be adjusted such that the UE's maximum uplink transmission power can be determined as relatively lower value. Here, $P_{CMAX\_L,c}$ can be determined according to a Power Management-Maximum Power Reduction (P-MPR). That is, $P_{CMAX\_L,c}$ can be determined according to the following equation:

$$P_{CMAX\_L,c} = \min\{P_{EMAX,c} - \Delta T_{C,c} - \Delta T_{IB,c},$$
$$P_{PowerClass} - \max(MPR_c + A\text{-}MPR_c, P\text{-}MPR_c) -$$
$$\Delta T_{C,c} - \Delta T_{IB,c}\} \quad \text{Equation (3)}$$

where $\Delta T_{IB,c}$ is determined according to whether there is an uplink transmission on other carriers. For example, if there is an uplink transmission on other carriers in the same TTI, $\Delta T_{IB,c}$ can be set to a predetermined value and, otherwise, set to 0 so as to be ignorable in Equation (3), and $\Delta T_{C,c}$ denotes a parameter corresponding to band-specific values for reducing $P_{CMAX,c}$.

If there is no PUSCH transmission in the corresponding serving cell, the transmission in the current cell does not influence the transmission in other cells, and thus, there is no need to consider the uplink transmissions in other cells when determining the UE's maximum uplink transmission power $P_{CMAx,c}(i)$. Accordingly, when there is no uplink transmission in the corresponding serving cell, the UE determines the maximum transmission power of the serving cell using the parameters that are not related to the uplink transmissions in other cells. For example, $P_{CMAx,c}(i)$ can be determined using the corresponding cell's allowed maximum transmission power $P_{EMAX}$ and the UE's implicit maximum transmission power $P_{powerclass}$. For example, $P_{CMAX,c}$ can be determined as follows:

$$P_{CMAX,c} = \min\{P_{EMAX}, P_{PowerClass}\} \quad \text{Equation (4)}$$

Using equation (4) is the same as saying that a Maximum Power Reduction (MPR), an Additional-MPR (A-MPR), a P-MPR, and a $\Delta Tc$ have the value of 0. $P_{CMAX}$ is determined to be in the range of $P_{CMAX\_L} \leq P_{CMAX\_L} \leq P_{CMAX\_H}$. If all of the MPR, the A-MPR, the P-MPR, and the $\Delta Tc$ have the value of 0, then $P_{CMAX\_L} = P_{CMAX\_H}$ and $P_{CMAX\_}P_{CMAX\_H}$. Here, $P_{CMAX\_H}$ is the lowest value selected between $P_{PowerClass}$ and $P_{EMAX}$. $P_{EMAX}$ is a cell-specific maximum allowed transmission power, and $P_{PowerClass}$ is a UE-specific maximum allowed transmission power. If there is no PUSCH transmission in the corresponding serving cell, this means no resource is allocated for PUSCH transmission, and thus, it is not clear which values should be used for $M_{PUSCH}$ and $\Delta_{TF}$. This lack of clarity results in a device enabling the UE and the eNB to calculate and interpret PH using the same $M_{PUSCH}$ and $\Delta_{TF}$.

The enablement of the UE and the eNB to calculate and interpret the PH can be achieved with the transmission format (which determines an amount and MCS level of the transmission resource) negotiated between the UE and eNB for the PH calculation when there is no PUSCH transmission. Assuming one Resource Block (RB) and a lowest MCS level as a reference transmission format, both the $M_{PUSCH}$ and $\Delta_{TF}$ become 0 so as to be ignorable in Equation (1). Accordingly, when there is no PUSCH transmission in the serving cell, the PH can be defined by Equation (5):

$$PH(i) = \min \{P_{EMAX}, P_{PowerClass}\} - \{P_{O\_PUSCH,c}(j) + \alpha_c(j) \cdot PL_c + f_c(i)\} \quad \text{Equation (5)}$$

In Equation (5), $P_{O\_PUSCH,C}$, $\alpha_c$, $f_c(i)$, and $PL_c$ are values derived from the corresponding serving cells calculating the PH rather than the serving cell in which the PHR is transmitted. The PH calculated according to the above equation is reported to the eNB along with the PHs of other serving cells in the PHR transmitted in the other serving cell. In view of the eNB, it is possible to check a plurality of PHs for the respective serving cells by checking one PHR. However, it is a problem that the eNB cannot check whether the PHs of the respective cells that are included in the PHR are calculated in consideration of the PUSCH transmission or using the PUSCH reference format of the exemplary embodiments herein. Without such knowledge, the eNB cannot interpret the reported PHs, and thus, it is difficult to expect efficient scheduling.

In order to overcome this problem, an indicator in the PHR formation is included. The present exemplary embodiment uses an indicator to indicate whether the PUSCH transmission is considered in the PH calculation reported in the PHR. This indicator is added in association with PHs of activated serving cells. This indicator has a length of 1 bit. If the PH of a certain cell is calculated based on the PUSCH transmission, i.e. using the actual transmission format, the UE sets the bit to a predetermined value (e.g. 0). Otherwise the PH is calculated using the reference format (i.e., a number of RBs=0 and $\Delta_{TF}=0$) due to no PUSCH transmission in the corresponding cell, and the UE sets the indicating bit to another value (e.g. 1).

Figure 6:
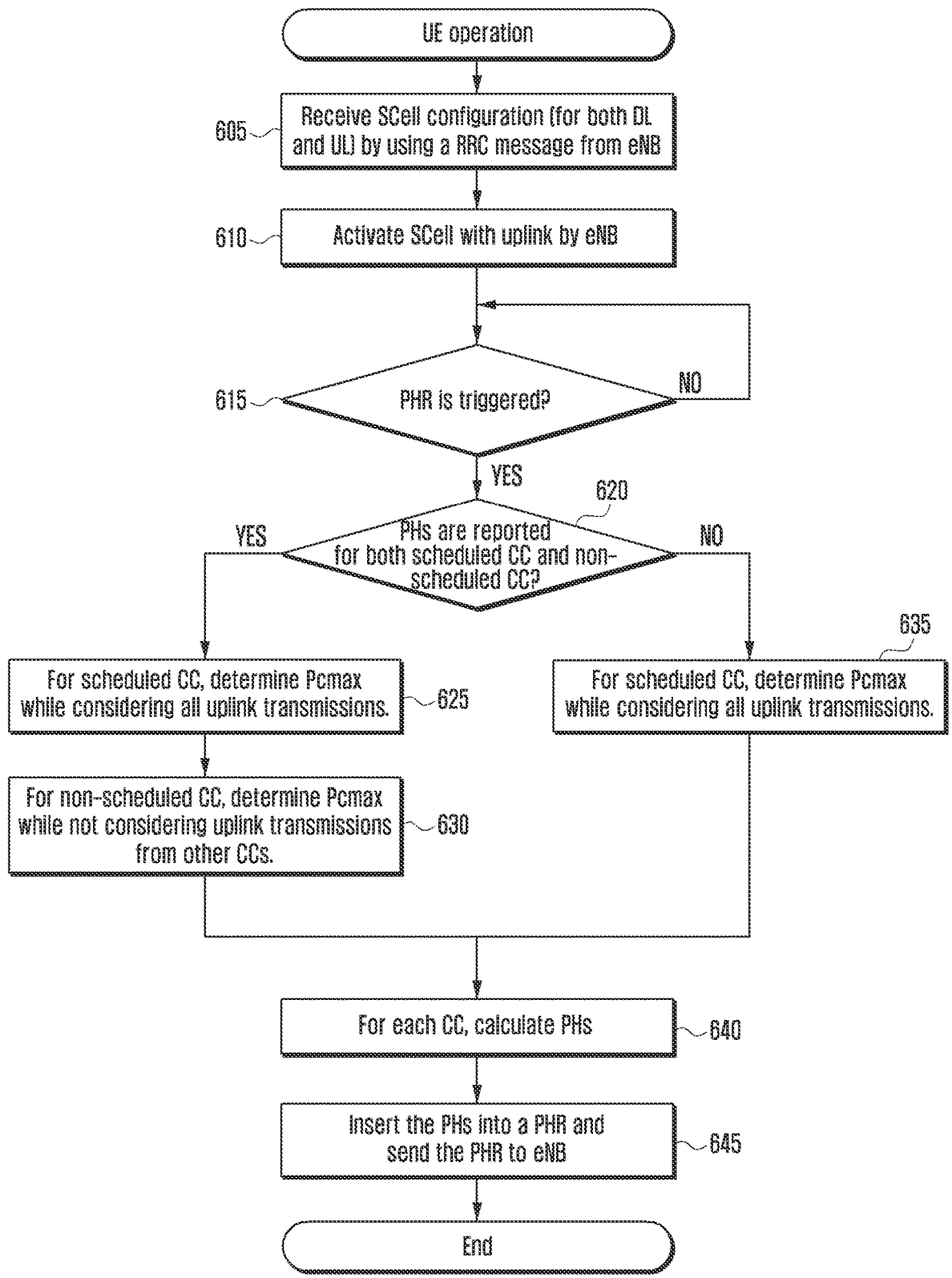
FIG. 6 is a flowchart illustrating a procedure for configuring PH of the UE according to an exemplary embodiment of the present invention.

FIG. 6 is a flowchart illustrating a procedure for configuring PH of the UE according to an exemplary embodiment of the present invention.

Referring to FIG. 6, the UE receives the Serving Cell (SCell) configuration information for both the DL and the UL on a plurality of carriers aggregated through an RRC message transmitted by the eNB in step 605. The eNB can configure the downlink carriers and the uplink carriers linked to the respective downlink carriers. Next, the UE activates the SCell by activating the uplink carriers using the MAC CE in order to actually transmit data on the uplink carriers in step 610. Afterward, the UE determines if a PHR is triggered in step 615. The PHR can be triggered periodically or a PHR trigger may be executed for a single time. If the PHR trigger is detected, the UE determines whether the PHs are reported for both the scheduled CC and the non-scheduled CC in step 620. In other words, the UE determines whether the PHR reports PHs of a plurality of carriers and whether there is a carrier on which no PUSCH is transmitted among the plural carriers.

If it is determined that there is at least one carrier on which no PUSCH is transmitted among the plurality of carriers, then the UE separates the carriers having PUSCH transmission and the carriers having no PUSCH transmission and calculates the UE's maximum transmission power $P_{CMAX,c}$ in steps 625 and 630. Specifically, the UE calculates $P_{CMAX,c}$ for the carriers having PUSCH transmission in consideration of all the uplink transmission in the corresponding TTI in step 625, and the UE calculates $P_{CMAX,c}$ for the carriers having no PUSCH transmission while not considering the uplink transmissions from other CCs in the corresponding TTI (e.g. using Equation (5)) in step 630. Otherwise, if it is determined that there is no carrier on which PUSCH is transmitted at step 620, the UE calculates $P_{CMAX,c}$ in consideration of all the uplink transmissions on the carriers having the PUSCH transmission in the corresponding TTI in step 635. Afterward, the UE 640 calculates PHs of the respective carriers, or in other words, for each CC, using the $P_{CMAX,c}$ in step 640. Next, the UE inserts the PHs into a PHR and sends the PHR to the eNB in step 645.

As described above, an exemplary embodiment of the present invention enables the UE to report the PHs of a plurality of carriers using an extended PHR in the mobile communication system supporting carrier aggregation. The UE determines the $P_{CMAX,c}$ of individual carriers according to whether the carriers are carrying the PUSCHs. At this time, the UE determines whether each carrier is used to transmit a PUSCH. If a PUSCH is actually transmitted on the CC, the UE determines the $P_{CMAX,c}$ of the CC in consideration of the uplink transmissions of other carriers. If the PUSCH is not transmitted on the CC, the UE determines the $P_{CMAX,c}$ of the CC with Equation (5), i.e. using a predetermined value. The UE generates an extended PHR with a plurality of PHs and transmits the extended PHR on one of a plurality of carriers.

Figure 7:
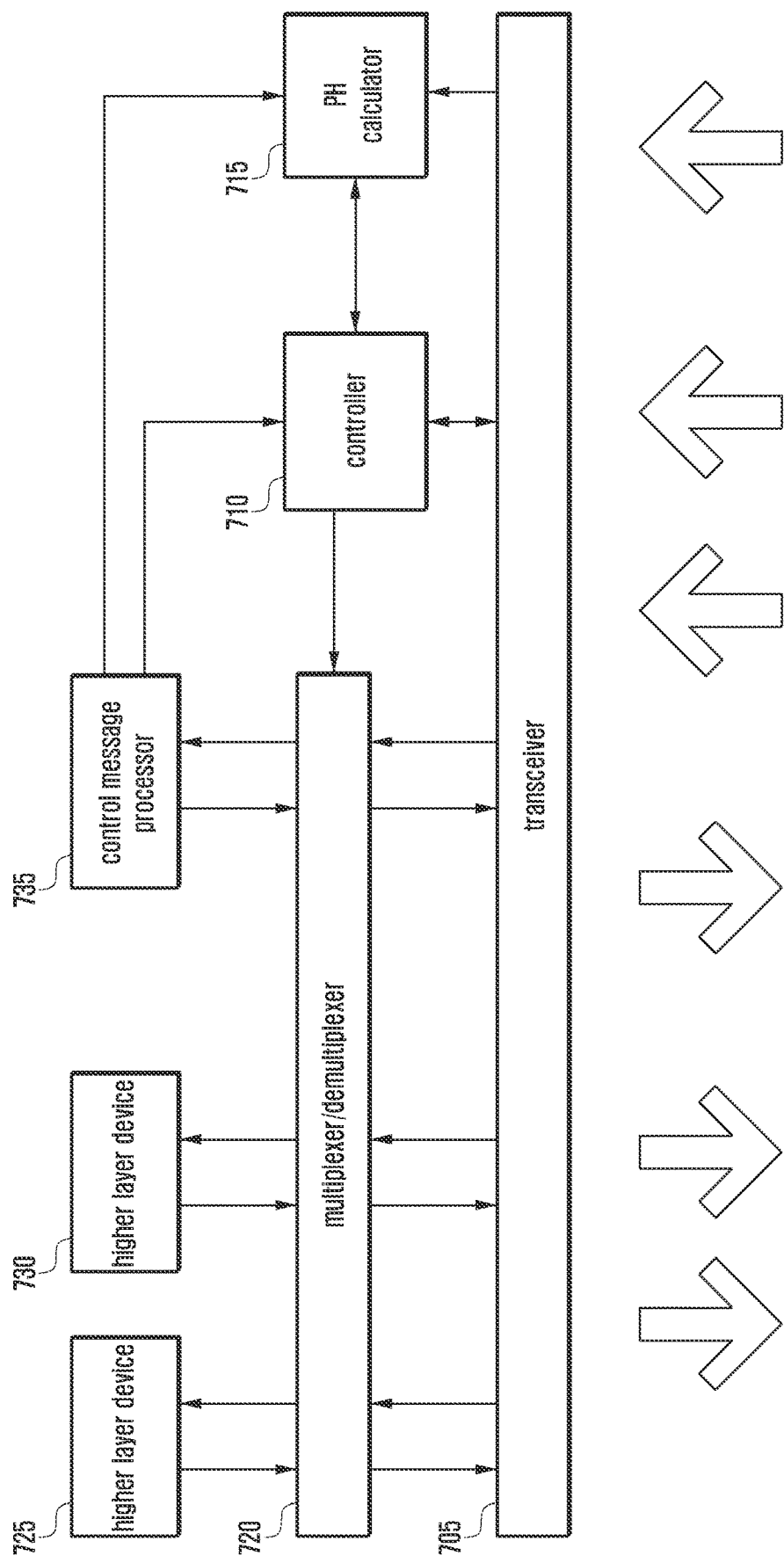
FIG. 7 is a block diagram illustrating a configuration of a PH reporting apparatus of the UE according to an exemplary embodiment of the present invention.

FIG. 7 is a block diagram illustrating a configuration of a PH reporting apparatus of the UE according to an exemplary embodiment of the present invention.

Referring to FIG. 7, the UE includes a transceiver 705, a PH calculator 715, a controller 710, a multiplexer/demultiplexer 720, a control message processor 735, and higher layer devices 725 and 730.

The transceiver 705 receives data and control signals on downlink carriers and transmits data and control signals on uplink carriers. In a case that a plurality of carriers is aggregated, the transceiver 705 can transmit/receive the data and control signals over the plurality of carriers.

The controller 710 controls the multiplexer/demultiplexer 720 so as to generate MAC PDUs according to a control signal received via the transceiver 705. For example, the control signal may be the scheduling information in an uplink grant. The controller detects a PHR trigger. If a PHR trigger is detected, the controller 710 controls the PH calculator 715 to calculate the PH. Whether the PHR is triggered can be determined by checking a PHR parameter provided by the control message processor 735. In a case that the PHs of multiple uplink carriers are reported in a PHR, the controller 710 controls the multiplexer/demultiplexer 720 to place an indicator in the MAC PDU, wherein the indicator indicates whether the PH for each carrier is derived from a real $P_{CMAX}$ or a virtual $P_{CMAX}$.

The controller 710 generates the PHR with the PHs provided by the PH calculator 715 and sends the PHR to the multiplexer/demultiplexer 720. In a case that multiple carriers are aggregated, the controller 710 can report the PHs using an extended PHR configured according to an exemplary embodiment of the present invention. At this time, the controller 710 can configure the PHs of the multiple carriers so as to be included in the extended PHR along with the transmission format indicators corresponding to the PHs. The controller 710 can transmit the extended PHR on one of the multiple carriers.

The PH calculator 715 calculates PH according to the control signal from the controller 710 and sends the PH to the controller 710. In a case that a plurality of carriers is aggregated, the PH calculator 715 can calculate PHs for the respective carriers. That is, the PH calculator 715 calculates the PHs for the carriers in consideration of whether PUSCH transmission takes place on each carrier. If the PUSCH transmission takes place, the PH calculator 715 can calculate the PH according to a normal method. Otherwise, if no PUSCH transmission takes place, the PH calculator 715 can calculate the PH with a predetermined reference format. At this time, the PH calculator 715 derives the PH using a virtual PCMAX for the carrier on which no PUSCH transmission takes place.

The multiplexer/demultiplexer 720 multiplexes the data from the higher layer devices 725 and 730 and/or control message processor 735 and demultiplexes the data received by the transceiver 705 for the higher layer devices 725 and 730 and/or the control message processor 735.

The control message processor 735 processes the control message transmitted by the network and takes any action commanded by the control message. The control message processor 735 forwards the PHR parameter carried in the control message to the controller 710 or forwards the information on the newly activated carriers to the transceiver 705 in order to set the carriers. The higher layer devices 725 and 730 can be implemented for their respective services so as to deliver the data generated by a user service, such as a FTP service and a VoIP service, to the multiplexer/demultiplexer 720. Alternatively, the higher layer devices 725 and 730 may process and deliver the data form the multiplexer/demultiplexer 720 to the service applications of the higher layer.

Once the UE reports the extended PHR, the eNB uses the extended PHR to determine an uplink transmission power. The eNB incudes a transceiver and a controller. The transceiver receives the extended PHR through one of the active carriers. The controller checks the PHs of the carriers according to the extended PHR.

As described above, the method and apparatus for determining a maximum transmission power in a mobile communication system supporting carrier aggregation is advantageous to determine the maximum transmission power per carrier more efficiently. As a consequence, the per-carrier maximum transmission power determination method and apparatus of the present invention is capable of controlling uplink transmission power efficiently in the mobile communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for reporting power headroom (PH) of a terminal in a mobile communication system supporting carrier aggregation, the method comprising:

receiving configuration information on one or more serving cells from a base station;

determining, for each serving cell of the one or more serving cells, whether the each serving cell is scheduled for an uplink transmission;

identifying a first maximum transmission power of the terminal for a first serving cell considering an uplink transmission of at least one other serving cell and first information related to an uplink transmission power, in response to the first serving cell being scheduled for the uplink transmission;

identifying a second maximum transmission power of the terminal for the first serving cell without considering the uplink transmission of the at least one other serving cell and second information related to an uplink transmission power, in response to the first serving cell not being scheduled for the uplink transmission;

calculating a PH of the first serving cell using the first maximum transmission power and the first information related to the uplink transmission power or the second maximum transmission power and the second information related to the uplink transmission power based on the determination of whether the first serving cell is scheduled for the uplink transmission; and transmitting, to the base station, an extended power headroom report (PHR) including respective calculated PHs of the one or more serving cells, wherein the first maximum transmission power of the terminal for the first serving cell is calculated based on an amount and position of allocated radio resources, a modulation and coding scheme (MCS), a channel bandwidth, and a frequency band of the at least one other serving cell on which the uplink transmission is performed and ΔTIB, c which is determined as a predetermined value, wherein, in response to the uplink transmission on at least one other serving cell not being performed, the first maximum transmission power of the terminal is calculated based on ΔTIB, c which is determined as 0, wherein the second maximum transmission power of the terminal for the first serving cell is calculated based on the parameters that are not related to the uplink transmissions in the at least one other serving cell, wherein the second information related to the uplink transmission power is calculated based on an assumption that a number of a resource block is 1 and lowest MCS level, and wherein the PH of the first serving cell is calculated according to the following equation:

$$PH(i)=P_{CMAX,c}(i)-\{10\log_{10}(M_{PUSCH,c}(i)+P_{O\_PUSCH,c}(j)+\alpha_c(j)\cdot PL_c+\Delta_{TF,c}(i)+f_c(i)\}$$

in which $P_{CMAX,c}(i)$ comprises a maximum uplink transmission power value, $M_{PUSCH,c}(i)$ comprises a number of resource blocks, $P_{O\_PUSCH,c}(j)$ comprises a higher layer parameter corresponding to a sum of cell-specific and UE-specific values, $\alpha_c(j)$ comprises a weight applied to a path loss, PLc comprises the path loss value of the first serving cell, $\Delta_{TF,c}$ comprises a power offset associated with the MCS, and $f_c(i)$ comprises a value of accumulated transmission power control commands of the first serving cell.

2. The method of claim 1, wherein the first maximum transmission power of the terminal is less than the second maximum transmission power of the terminal.

3. The method of claim 1, wherein the respective calculated PHs are arranged in a predetermined order in the extended PHR.

4. The method of claim 1, wherein the extended PHR is transmitted on one of the serving cells.

5. The method of claim 1, further comprising:

configuring an indicator of the first serving cell indicating whether a corresponding PH is calculated using the first maximum transmission power or the second transmission power of the first serving cell, wherein the extended PHR further includes respective configured indicators of the one or more serving cells.

6. The method of claim 1, wherein $P_{CMAX\_L,c}$ for determining the first maximum transmission power is determined according to the following equation:

$$P_{CMAX\_L,c}=\min\{P_{EMAX,c}-\Delta T_{C,c}-\Delta T_{IB,c}, P_{PowerClass}-\max(MPR_c+A\text{-}MPR_c, P\text{-}MPR_c)-\Delta T_{C,c}-\Delta T_{IB,c}\}$$

in which $P_{EMAX,c}$ comprises a value determined by a higher layer signalling, $\Delta T_{C,c}$ comprises a predetermined value, $P_{PowerClass}$ is a maximum power of the terminal, $MPR_c$ comprises a value of maximum power reduction, $A\text{-}MPR_c$ comprises a value of additional maximum power reduction, and $P\text{-}MPR_c$ comprises a value of peak-maximum power reduction.

7. A method of a base station for receiving power headroom (PH) in a mobile communication system supporting carrier aggregation, the method comprising:
transmitting configuration information on one or more serving cells to a terminal; and
receiving an extended power headroom report (PHR) including respective calculated PHs of the one or more serving cells from the terminal,
wherein a PH of a first serving cell in the one or more serving cells is calculated using a first maximum transmission power of the terminal and first information related to an uplink transmission power or a second maximum transmission power of the terminal and second information related to an uplink transmission power based on a determination of whether the first serving cell is scheduled for an uplink transmission,
wherein the first maximum transmission power of the terminal for the first serving cell considering an uplink transmission of at least one other serving cell and the first information related to the uplink transmission power are identified, in response to the first serving cell being scheduled for the uplink transmission,
wherein the second maximum transmission power of the terminal for the first serving cell without considering the uplink transmission of the at least one other serving cell and the second information related to the uplink transmission power are identified, in response to the first serving cell not being scheduled for the uplink transmission,
wherein the first maximum transmission power of the terminal for the first serving cell is calculated based on an amount and position of allocated radio resources, a modulation and coding scheme (MCS), a channel bandwidth, and a frequency band of the at least one other serving cell on which the uplink transmission is performed and $\Delta TIB, c$ which is determined as a predetermined value,
wherein, in response to the uplink transmission on at least one other serving cell not being performed, the first maximum transmission power of the terminal is calculated based on $\Delta TIB, c$ which is determined as 0,
wherein the second maximum transmission power of the terminal for the first serving cell is calculated based on the parameters that are not related to the uplink transmissions in the at least one other serving cell,
wherein the second information related to the uplink transmission power is calculated based on an assumption that a number of a resource block is 1 and lowest MCS level, and
wherein the PH of the first serving cell is calculated according to the following equation:

$$PH(i)=P_{CMAX,c}(i)-\{10\log_{10}(M_{PUSCH,c}(i)+P_{O\_PUSCH,c}(j)+\alpha_c(j)\cdot PL_c+\Delta_{TF,c}(i)+f_c(i)\}$$

in which $P_{CMAX,c}(i)$ comprises a maximum uplink transmission power value, $M_{PUSCH,c}(i)$ comprises a number of resource blocks, $P_{O\_PUSCH,c}(j)$ comprises a higher layer parameter corresponding to a sum of cell-specific and UE-specific values, $\alpha_c(j)$ comprises a weight applied to a path loss, $PL_c$ comprises the path loss value of the first serving cell, $\Delta_{TF,c}$ comprises a power offset associated with the MCS, and $f_c(i)$ comprises a value of accumulated transmission power control commands of the first serving cell.

8. The method of claim 7, wherein the first maximum transmission power of the terminal is less than the second maximum transmission power of the terminal.

9. The method of claim 7, wherein the respective calculated PHs are arranged in a predetermined order in the extended PHR.

10. The method of claim 7, wherein the extended PHR is received on one of the serving cells.

11. The method of claim 7,
wherein the extended PHR includes respective indicators of the one or more serving cells, and
wherein an indicator of the first serving cell indicates whether a corresponding PH is calculated using the first maximum transmission power or the second maximum transmission power of the first serving cell.

12. The method of claim 7, wherein $P_{CMAX\_L,c}$ for determining the first maximum transmission power is determined according to the following equation:

$$P_{CMAX\_L,c}=\min\{P_{EMAX,c}-\Delta T_{C,c}-\Delta T_{IB,c}, P_{PowerClass}-\max(MPR_c+A\text{-}MPR_c, P\text{-}MPR_c)-\Delta T_{C,c}-\Delta T_{IB,c}\}$$

in which $P_{EMAX,c}$ comprises a value determined by a higher layer signalling, $\Delta T_{C,c}$ comprises a predetermined value, $P_{PowerClass}$ is a maximum power of the terminal, $MPR_c$ comprises a value of maximum power reduction, $A\text{-}MPR_c$ comprises a value of additional maximum power reduction, and $P\text{-}MPR_c$ comprises a value of peak-maximum power reduction.

13. An apparatus for reporting power headroom (PH) of a terminal in a mobile communication system supporting carrier aggregation, the apparatus comprising:
a receiver configured to receive configuration information on one or more serving cells;
a controller configured to:
determine for each serving cell of the one or more serving cells, whether the each serving cell is scheduled for an uplink transmission,
identify a first maximum transmission power of the terminal for a first serving cell considering an uplink transmission of at least one other serving cell and first information related to an uplink transmission power, in response to it being determined that the first serving cell is scheduled for the uplink transmission,
identify a second maximum transmission power of the terminal for the first serving cell without considering the uplink transmission of the at least one other serving cell and second information related to an uplink transmission power, in response to it being determined that the first serving cell is not scheduled for the uplink transmission, and
calculate a PH of the first serving cell using the first maximum transmission power and the first information related to the uplink transmission power or the second maximum transmission power and the second information related to the uplink transmission power based on the determination of whether the first serving cell is scheduled for the uplink transmission; and a transmitter configured to transmit an extended power headroom report (PHR) including respective calculated PHs of the one or more serving cells, wherein the first maximum transmission power of the terminal for the first serving cell is calculated based on an amount and position of allocated radio resources, a modulation and coding scheme (MCS), a channel bandwidth, and a frequency band of the at least one other serving cell on which the uplink transmission is performed and $\Delta TIB,c$ which is determined as a predetermined value, wherein, in response to the uplink transmission on at least one other serving cell not being performed, the first maximum transmission power of the terminal is calculated based on $\Delta TIB,c$ which is determined as 0, wherein the second maximum transmission power of the terminal for the first serving cell is calculated based on the parameters that are not related to the uplink transmissions in the at least one other serving cell, wherein the second information related to the uplink transmission power is calculated based on an assumption that a number of a resource block is 1 and lowest MCS level, and wherein the PH of the first serving cell is calculated according to the following equation:

$$PH(i)=P_{CMAX,c}(i)-\{10 \log_{10}(M_{PUSCH,c}(i)+ P_{O\_PUSCH,c}(j)+\alpha_c(j) \cdot PL_c+\Delta_{TF,c}(i)+f_c(i)\}$$

in which $P_{CMAX,c}(i)$ comprises a maximum uplink transmission power value, $M_{PUSCH,c}(i)$ comprises a number of resource blocks, $P_{O\_PUSCH,c}(j)$ comprises a higher layer parameter corresponding to a sum of cell-specific and UE-specific values, $\alpha_c(j)$ comprises a weight applied to a path loss, PLc comprises the path loss value of the first serving cell, $\Delta_{TF,c}$ comprises a power offset associated with the MCS, and $f_c(i)$ comprises a value of accumulated transmission power control commands of the first serving cell.

14. The apparatus of claim 13, wherein the first maximum transmission power of the terminal is less than the second maximum transmission power of the terminal.

15. The apparatus of claim 13, wherein the respective calculated PHs are arranged in a predetermined order in the extended PHR.

16. The apparatus of claim 13, wherein the extended PHR is transmitted on one of the serving cells.

17. The apparatus of claim 13,
wherein the controller is further configured to configure an indicator of the first serving cell indicating whether a corresponding PH is calculated using the first maximum transmission power or the second transmission power of the first serving cell, and
wherein the extended PHR further includes respective configured indicators of the one or more serving cells.

18. The apparatus of claim 13, wherein $P_{CMAX\_L,c}$ for determining the first maximum transmission power is determined according to the following equation:

$$P_{CMAX\_L,c}=\min \{P_{EMAX,c}-\Delta T_{C,c}-\Delta T_{IB,c}, P_{PowerClass}-\max(MPR_c+A-MPR_c, P-MPR_c)-\Delta T_{C,c}-\Delta T_{IB,c}\}$$

in which $P_{EMAX,c}$ comprises a value determined by a higher layer signalling, $\Delta T_{C,c}$ comprises a predetermined value, $P_{PowerClass}$ is a maximum power of the terminal, $MPR_c$ comprises a value of maximum power reduction, $A\text{-}MPR_c$ comprises a value of additional maximum power reduction, and $P\text{-}MPR_c$ comprises a value of peak-maximum power reduction.

19. An apparatus of a base station for receiving power headroom (PH) in a mobile communication system supporting carrier aggregation, the apparatus comprising:
a transmitter configured to transmit configuration information on one or more serving cells to a terminal; and
a receiver configured to receive an extended power headroom report (PHR) including respective calculated PHs of the one or more serving cells from the terminal,
wherein a PH of a first serving cell in the one or more serving cells is calculated using a first maximum transmission power of the terminal and first information related to an uplink transmission power or a second maximum transmission power of the terminal and second information related to an uplink transmission power based on a determination of whether the first serving cell is scheduled for an uplink transmission,
wherein the first maximum transmission power of the terminal for the first serving cell considering an uplink transmission of at least one other serving cell and the first information related to the uplink transmission power are identified, in response to it being determined that the first serving cell is scheduled for the uplink transmission,
wherein the second maximum transmission power of the terminal for the first serving cell without considering the uplink transmission of the at least one other serving cell and the second information related to the uplink transmission power are identified, in response to it being determined that the first serving cell is not scheduled for the uplink transmission,
wherein the first maximum transmission power of the terminal for the first serving cell is calculated based on an amount and position of allocated radio resources, a modulation and coding scheme (MCS), a channel bandwidth, and a frequency band of the at least one other serving cell on which the uplink transmission is performed and $\Delta TIB,c$ which is determined as a predetermined value,
wherein, in response to the uplink transmission on at least one other serving cell not being performed, the first maximum transmission power of the terminal is calculated based on $\Delta TIB,c$ which is determined as 0,
wherein the second maximum transmission power of the terminal for the first serving cell is calculated based on the parameters that are not related to the uplink transmissions in the at least one other serving cell,
wherein the second information related to the uplink transmission power is calculated based on an assumption that a number of a resource block is 1 and lowest MCS level, and
wherein the PH of the first serving cell is calculated according to the following equation:

$$PH(i)=P_{CMAX,c}(i)-\{10 \log_{10}(M_{PUSCH,c}(i)+ P_{O\_PUSCH,c}(j)+\alpha_c(j) \cdot PL_c+\Delta_{TF,c}(i)+f_c(i)\}$$

in which $P_{CMAX,c}(i)$ comprises a maximum uplink transmission power value, $M_{PUSCH,c}(i)$ comprises a number of resource blocks, $P_{O\_PUSCH,c}(j)$ comprises a higher layer parameter corresponding to a sum of cell-specific and UE-specific values, $\alpha_c(j)$ comprises a weight applied to a path loss, PLc comprises the path loss value of the first serving cell, $\Delta_{TF,c}$ comprises a power offset associated with the MCS, and $f_c(i)$ comprises a value of accumulated transmission power control commands of the first serving cell.

20. The apparatus of claim 19, wherein the first maximum transmission power of the terminal is less than the second maximum transmission power of the terminal.

21. The apparatus of claim 19, wherein the respective calculated PHs are arranged in a predetermined order in the extended PHR.

22. The apparatus of claim 19, wherein the extended PHR is received on one of the serving cells.

23. The apparatus of claim 19,
wherein the extended PHR includes respective indicators of the one or more serving cells, and
wherein an indicator of the first serving cell indicates whether a corresponding PH is calculated using the first maximum transmission power or the second maximum transmission power of the first serving cell.

24. The apparatus of claim 19, wherein $P_{CMAX\_L,c}$ for determining the first maximum transmission power is determined according to the following equation:

$$P_{CMAX\_L,c} = \min \{P_{EMAX,c} - \Delta T_{C,c} - \Delta T_{IB,c}, P_{PowerClass} - \max(MPR_c + A\text{-}MPR_c, P\text{-}MPR_c) - \Delta T_{C,c} - \Delta T_{IB,c}\}$$

in which $P_{EMAX,c}$ comprises a value determined by a higher layer signalling, $\Delta T_{C,c}$ comprises a predetermined value, $P_{PowerClass}$ is a maximum power of the terminal, $MPR_c$ comprises a value of maximum power reduction, $A\text{-}MPR_c$ comprises a value of additional maximum power reduction, and $P\text{-}MPR_c$ comprises a value of peak-maximum power reduction.

* * * * *